US010862778B2

(12) United States Patent
Dagum et al.

(10) Patent No.: US 10,862,778 B2
(45) Date of Patent: Dec. 8, 2020

(54) METHOD AND APPARATUS FOR PROVIDING PERFORMANCE AND USAGE INFORMATION FOR A WIRELESS LOCAL AREA NETWORK

(71) Applicants: ADAPTIVE SPECTRUM AND SIGNAL ALIGNMENT, INC., Redwood City, CA (US); Leonardo Dagum, Redwood City, CA (US); Tuncay Cil, San Francisco, CA (US); Lan Ke, Fremont, CA (US); Wooyul Lee, Palo Alto, CA (US)

(72) Inventors: Leonardo Dagum, Redwood City, CA (US); Tuncay Cil, San Francisco, CA (US); Lan Ke, Fremont, CA (US); Wooyul Lee, Palo Alto, CA (US)

(73) Assignee: ASSIA SPE, LLC, Wilmington, DE (US)

( * ) Notice: Subject to any disclaimer, the term of this patent is extended or adjusted under 35 U.S.C. 154(b) by 312 days.

(21) Appl. No.: 15/506,225

(22) PCT Filed: Oct. 30, 2014

(86) PCT No.: PCT/US2014/063256
§ 371 (c)(1),
(2) Date: Feb. 23, 2017

(87) PCT Pub. No.: WO2016/068960
PCT Pub. Date: May 6, 2016

(65) Prior Publication Data
US 2018/0041408 A1 Feb. 8, 2018

(51) Int. Cl.
G06F 15/173 (2006.01)
H04L 12/26 (2006.01)
(Continued)

(52) U.S. Cl.
CPC .......... *H04L 43/045* (2013.01); *H04L 43/065* (2013.01); *H04W 24/10* (2013.01);
(Continued)

(58) Field of Classification Search
CPC ..... H04L 43/045; H04L 43/065; H04L 43/14; H04L 43/0876; H04W 24/10; H04W 84/12
See application file for complete search history.

(56) References Cited

U.S. PATENT DOCUMENTS

2008/0244527 A1* 10/2008 Chang ................ G06F 8/20
717/127
2009/0113052 A1 4/2009 Doshi et al.
(Continued)

FOREIGN PATENT DOCUMENTS

CN 101226525 B 7/2008
CN 102014020 A 4/2011
(Continued)

OTHER PUBLICATIONS

Office Action dated Feb. 21, 2017 in Korean Patent Application No. 10-2017-7006954 (5pgs).
(Continued)

*Primary Examiner* — John B Walsh
(74) *Attorney, Agent, or Firm* — North Weber and Baugh LLP; Michael North

(57) ABSTRACT

A server coupled in communication with the WLAN, or an agent executing on at least one of the plurality of devices, receives input from the device to select one or more of the WLAN and the plurality of devices for which to report the current, and historical, performance and usage information to the device. A server or the agent retrieves the historical performance and usage information for the selected one or more of the WLAN and the plurality of devices. The server
(Continued)

or the agent further retrieves the current performance and usage information from the selected one or more of the WLAN and the plurality of devices. The server, or the agent, transmits for presentation in a graphical user interface (GUI) on a display screen of the device, the current, and historical, performance and usage information for the selected one or more of the WLAN and the plurality of devices.

26 Claims, 4 Drawing Sheets

(51) Int. Cl.
    *H04W 24/10*     (2009.01)
    *H04W 84/12*     (2009.01)

(52) U.S. Cl.
    CPC .......... *H04L 43/0876* (2013.01); *H04L 43/14* (2013.01); *H04W 84/12* (2013.01)

(56) References Cited

U.S. PATENT DOCUMENTS

| | | |
|---|---|---|
| 2009/0191876 A1 | 7/2009 | Jain et al. |
| 2010/0246416 A1 | 9/2010 | Sinha et al. |
| 2012/0155308 A1 | 6/2012 | Lee et al. |
| 2012/0314573 A1* | 12/2012 | Edwards ................ H04L 12/66 370/230.1 |
| 2013/0185433 A1* | 7/2013 | Zhu ...................... H04L 67/303 709/226 |
| 2014/0350716 A1* | 11/2014 | Fly ........................ G06F 1/3212 700/215 |
| 2015/0012147 A1* | 1/2015 | Haghighat-Kashani ..................... G06Q 30/02 700/291 |
| 2015/0066896 A1* | 3/2015 | Davis .................. G06F 16/9038 707/710 |
| 2016/0043924 A1* | 2/2016 | Cejnar ................ G06F 11/3006 709/224 |
| 2016/0105359 A1* | 4/2016 | Kim ........................ H04L 43/08 370/252 |
| 2016/0150434 A1* | 5/2016 | Abinader, Jr. .......... H04W 4/00 455/67.11 |

FOREIGN PATENT DOCUMENTS

| | | |
|---|---|---|
| JP | 2002009971 | 1/2002 |
| KR | 1020060117030 | 11/2006 |
| KR | 1020130057330 | 5/2013 |
| WO | 20140138817 A1 | 9/2014 |

OTHER PUBLICATIONS

Office Action dated Jul. 26, 2018 in Korean Patent Application No. 1020177006954 (3pgs).
Extended European Search Report dated Mar. 14, 2018, in European Patent Application No. 14905229.2 (7pgs).
International Search Report and Written Opinion for International Patent Application PCT/US2014/063256, dated Jul. 27, 2015.
First Office Action and Search Report dated Mar. 19, 2020 in the related Chinese Patent Application No. 201480082947.X, (19 pgs).
European Office Action dated Jun. 24, 2020 in related European Patent Application No. 14905229.2, (7 pgs).

* cited by examiner

METHOD AND APPARATUS FOR PROVIDING PERFORMANCE AND USAGE INFORMATION FOR A WIRELESS LOCAL AREA NETWORK

CLAIM OF PRIORITY

This Application is a National Stage Entry of, and claims priority to, PCT Application No. PCT/US14/63256, filed on 30 Oct. 2014 and titled "METHOD AND APPARATUS FOR PROVIDING PERFORMANCE AND USAGE INFORMATION FOR A WIRELESS LOCAL AREA NETWORK," which is incorporated by reference in its entirety for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the present invention relates to reporting, to a device, performance and usage information of a wireless local area network.

BACKGROUND

Prior art WiFi routers and access points expose rudimentary management and monitoring tools to end users. These tools only provide a way for end users to change specific settings on a device, but do not expose performance or usage information for the network or devices in the network. Without this information it is very difficult for an end user to gauge the impact of any changes to the device settings and measure the improvement or degradation of the WiFi network as a consequence of any such changes.

Further, the number of routers and access points continues to grow and the average number of user devices connected to these devices is growing faster still, making it very challenging for a user to get the best performance from the WiFi network to which their device is connected. Chip vendors have responded by adding logic to self-optimize the WiFi network, but these solutions are restricted to purely online algorithms since they operate with limited resources and can only see recent data that has been passively collected. The WiFi network is a very dynamic environment with stations connecting and disconnecting essentially at random. Consequently it would be helpful for the information to be available both in real time and over long intervals for a machine or a human to make a better-informed decision based on the performance of the network.

What is needed is a method and apparatus that can take passive measurements and also make active probing measurements of the network performance in real time, and can store this data, for example, in the cloud, thereby removing any resource limitations with respect to data collection, storage and processing.

BRIEF DESCRIPTION OF THE DRAWINGS

Embodiments are illustrated by way of example, and not by way of limitation, and can be more fully understood with reference to the following detailed description when considered in connection with the figures in which.

DETAILED DESCRIPTION

Figure 1:
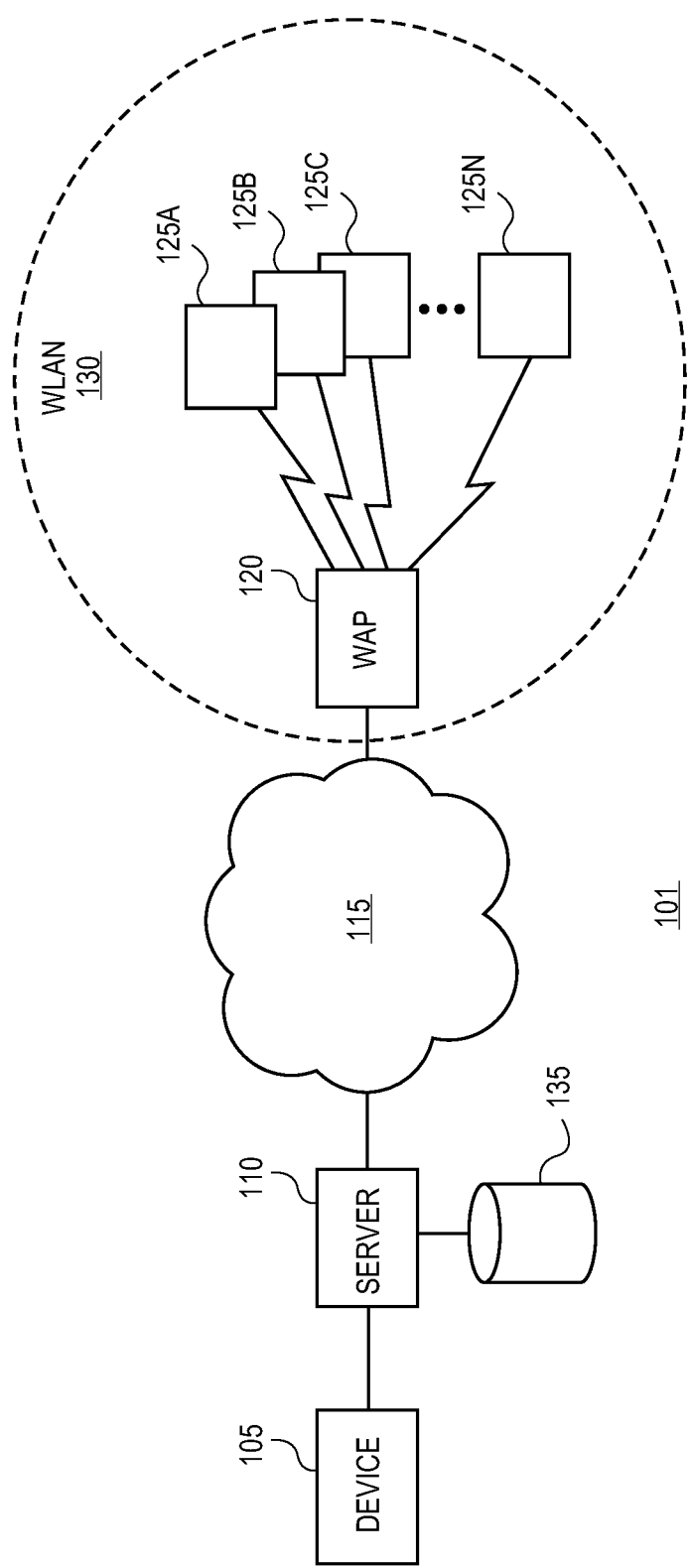
FIG. 1 illustrates a computing environment in which an embodiment of the invention operates.
Figure 4:
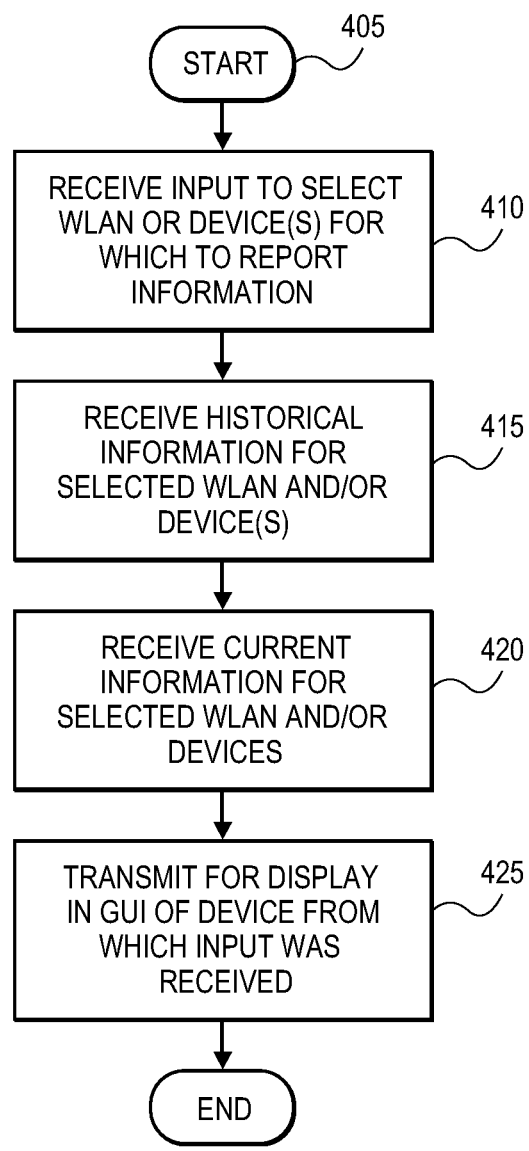
FIG. 4 provides a flow diagram of an embodiment of the invention.

According to one embodiment of the invention, an apparatus and method provide current performance and usage information, as well as historical performance and usage information to a device regarding a wireless local area network (WLAN), and/or one or more devices coupled to the WLAN. As illustrated in FIG. 1, and with reference to FIG. 4, the process starts at 405 wherein a server 110 coupled in communication with WLAN 130, or an agent executing on at least one of the devices in the WLAN, such as wireless access point 120 or computing devices 125a-125n, receives input at 410 from a device 105 to select one or more of the WLAN 130 and the devices 120 and 125a-125n coupled to the WLAN for which to report the current performance and usage information and the historical performance and usage information to the device 105. The server 110 or the agent retrieves at 415 the historical performance and usage information for the selected one or more of the WLAN and the devices coupled to the WLAN. Additionally, the server or the agent retrieves at 420 the current performance and usage information from the selected one or more of the WLAN and the devices coupled to the WLAN. Once both the selected historical and selected current performance and usage information is received, the server 110 or the agent then transmits at 425 the information to device 105.

Current performance and usage information is defined herein to include one or more of: a data transmission throughput, network-layer throughput, latency, jitter, connectivity, error rates, a received signal strength indication, a signal-to-noise ratio, power consumption, transmit power, security information, and quantity of data bytes transmitted, for a WLAN and one or more devices coupled to the WLAN according to or on a timeline, or in comparison to a historical baseline for the same data elements.

In the embodiment where the agent executing on at least one of the devices 120, 125a-125n receives the input from the device 105 to select the WLAN and/or one or more of the devices for which to report the current performance and usage information and the historical performance and usage information to the device, the agent issues a request to the server 110 coupled in communication with the agent to provide the historical performance and usage information for the selected WLAN and/or devices coupled to the WLAN. The server then provides the selected information to the agent responsive to the request.

In one embodiment, the agent also issues an additional request to the server 110 to provide the current performance and usage information for the selected WLAN and/or devices coupled to the WLAN. In such an embodiment, current performance and usage information for the WLAN and the devices coupled to the WLAN is uploaded to the server, where it is processed and validated at the server before the agent issues the additional request to the server to provide the current performance and usage information for the selected WLAN and/or devices coupled to the WLAN.

While the embodiment illustrated in FIG. 1 depicts the server 110 coupled in communication with an agent executing on one of devices 120, 125a-125n over an internetwork 115, in other embodiments, the server may be co-located with the agent on one of the devices coupled to the WLAN, or located on a different one of the devices coupled to the WLAN than the device on which the agent is located.

In one embodiment, when the server receives a request for the historical performance and usage information, the server accesses a memory storage system accessible on, or to, the server. In one embodiment, the memory storage subsystem may be directly coupled to the server, for example, as an external hard drive 135. In another embodiment, storage may be in, or accessible via, the internetwork 115.

The server may, in one embodiment, compile the historical performance and usage information for the selected WLAN and/or devices coupled to the WLAN by way of measurements collected over a period of time. These measurements are then stored in the memory storage system accessible on or to the server, for later retrieval and provisioning to an agent responsive to the agent issuing a request to the server to provide the historical performance and usage information for the selected WLAN and/or devices coupled to the WLAN.

In the embodiment where the server 110 receives the input from the device 105 to select the WLAN and/or one or more of the devices coupled to the WLAN for which to report the current performance and usage information and the historical performance and usage information to the device, the server issues a request to the agent to provide the historical performance and usage information for the selected WLAN and/or devices coupled to the WLAN. The server then retrieves the historical performance and usage information from the agent responsive to the request. According to one embodiment, the server receives periodic UDP pings issued from the agent to maintain a network address and port translation (NAPT) rule so that the server is able to issue the request to the agent at any time in order to provide the historical performance and usage information for the selected WLAN and/or devices coupled to the WLAN. In one embodiment, the server also issues an additional request to the agent to provide the current performance and usage information for the selected WLAN and/or the devices coupled to the WLAN and retrieves such information responsive to the additional request.

Figure 2:
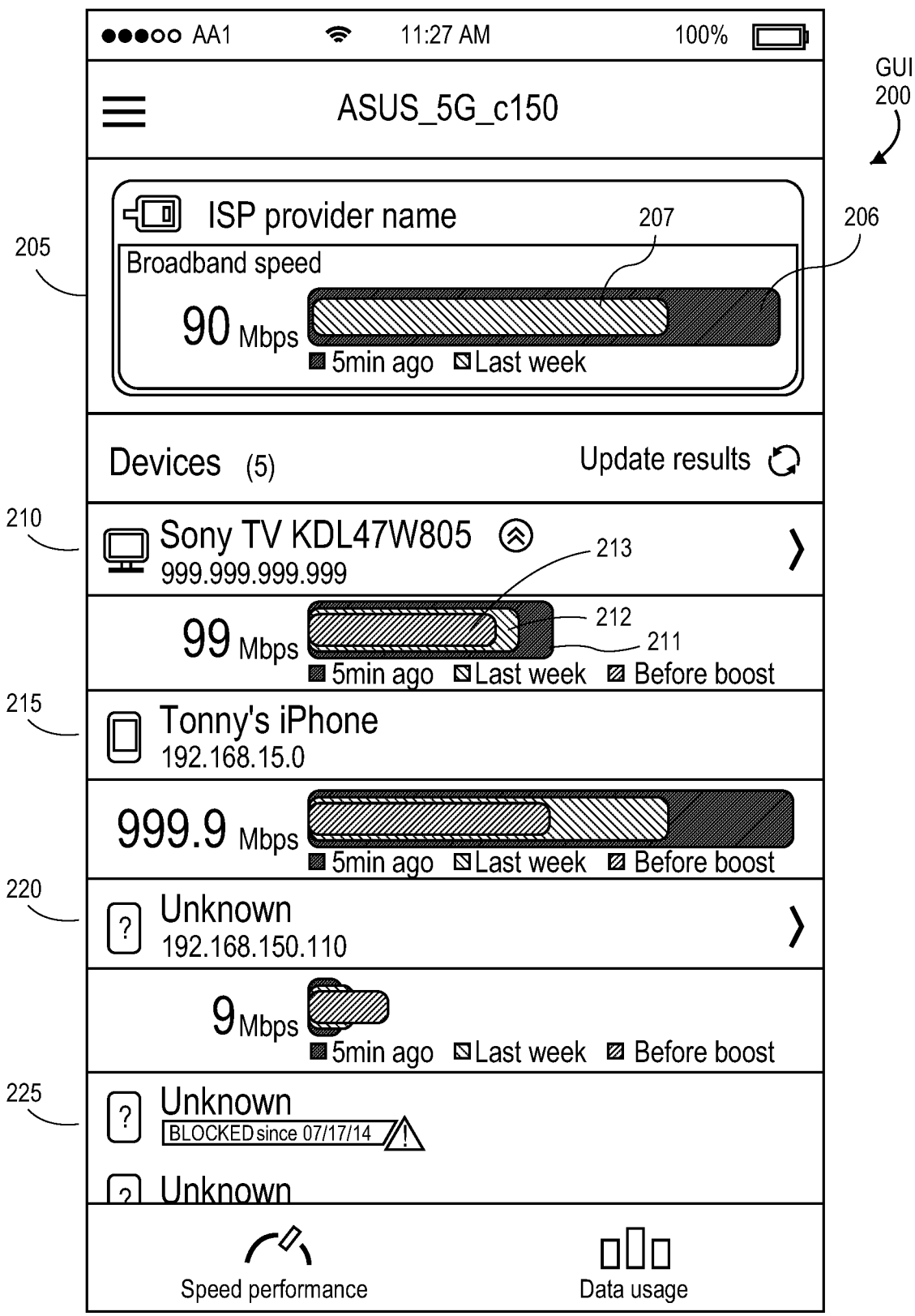
FIG. 2 illustrates an example GUI display in accordance with an embodiment of the invention.

In one embodiment, the device 105 receives the information and presents it in a graphical user interface (GUI), for example, GUI 200 depicted in FIG. 2, on a display screen or surface of, or accessible to, the device 105. As depicted, the information includes the current speed 206 and historical speed 207 of a broadband network 115 to which the WLAN 130 is coupled, as well as current and historical performance and usage information for a number of devices 210, 215, 220, and 225. For example, current performance and usage information 211 is provided for device 210, as well as historical performance and usage information 212, e.g., from the previous week. In one embodiment, performance and usage information prior to an event is provided, such as an action performed on the device 210 that affects performance and/or usage of the device, such as optimization of the communication of the device in the WLAN ("before boost") 213.

In one embodiment, in addition to providing current performance and usage information 211, and historical performance and usage information 212, for one or more of devices 210, 215, 220, and 225, in the GUI 200 on the display screen of the device 105, further information may be provided, such as a type associated with a device, a status of a device, and actions performed on the device that affect performance and/or usage of one or more of the WLAN and other devices coupled to the WLAN.

FIG. 2 illustrates presenting in the GUI 200 on the display screen of the device 105 the current performance and usage information and the historical performance and usage information for the selected WLAN 205 and devices 205, 210, 215, 220 and 225 in a series of bar charts. For example, the current performance and usage information for selected device 210 is depicted in graphical bar 211, and the historical performance and usage information for the selected device 210 is depicted in graphical bar 212. In one embodiment, graphical bars may overlap, at least in part, another graphical bar. For example, graphical bar 212 overlays graphical bar 211, and graphical bar 213, in turn, overlays graphical bar 212. As shown in FIG. 2, these different graphical bars 211, 212, and 213 are distinguished from each other by a different graphical characteristic. While the embodiment depicted in FIG. 2 demonstrates different colors for different bars as the means by which the different bars are distinguished from each other, other graphical characteristics may be used other than or in addition to color, such as shading, transparency, translucency, and use of borders.

Additional embodiments of the invention contemplate presenting in the GUI on the display screen of the device the current performance and usage information and the historical performance and usage information for selected WLAN and/or devices in a vertically-scrolling newsfeed-style display, or a multiple page view display, in which a selected one of the multiple page views is displayed by receiving user input, for example, swiping or tapping the display screen to transition to the selected one of the multiple page views. In one embodiment, the newsfeed style display may be sorted according to a priority or ordering scheme including or based on: a chronological ordering scheme, a reverse chronological ordering scheme, a magnitude of change in performance for the WLAN and/or the devices, a type associated with the devices, a status for the devices, actions performed on the devices that affect performance and/or usage of the WLAN and/or the devices, an action performed on a particular device that affects its performance and/or usage, and base station identifiers either from the same or multiple wireless access points.

In another embodiment, current and historical performance and usage information for a particular device could be shown together on the display screen, or consecutively, or ordered entirely distinct from the device. In yet another embodiment, information from different base station identifiers (BSSIDs) may be separated into different views (or tabs).

Figure 3:
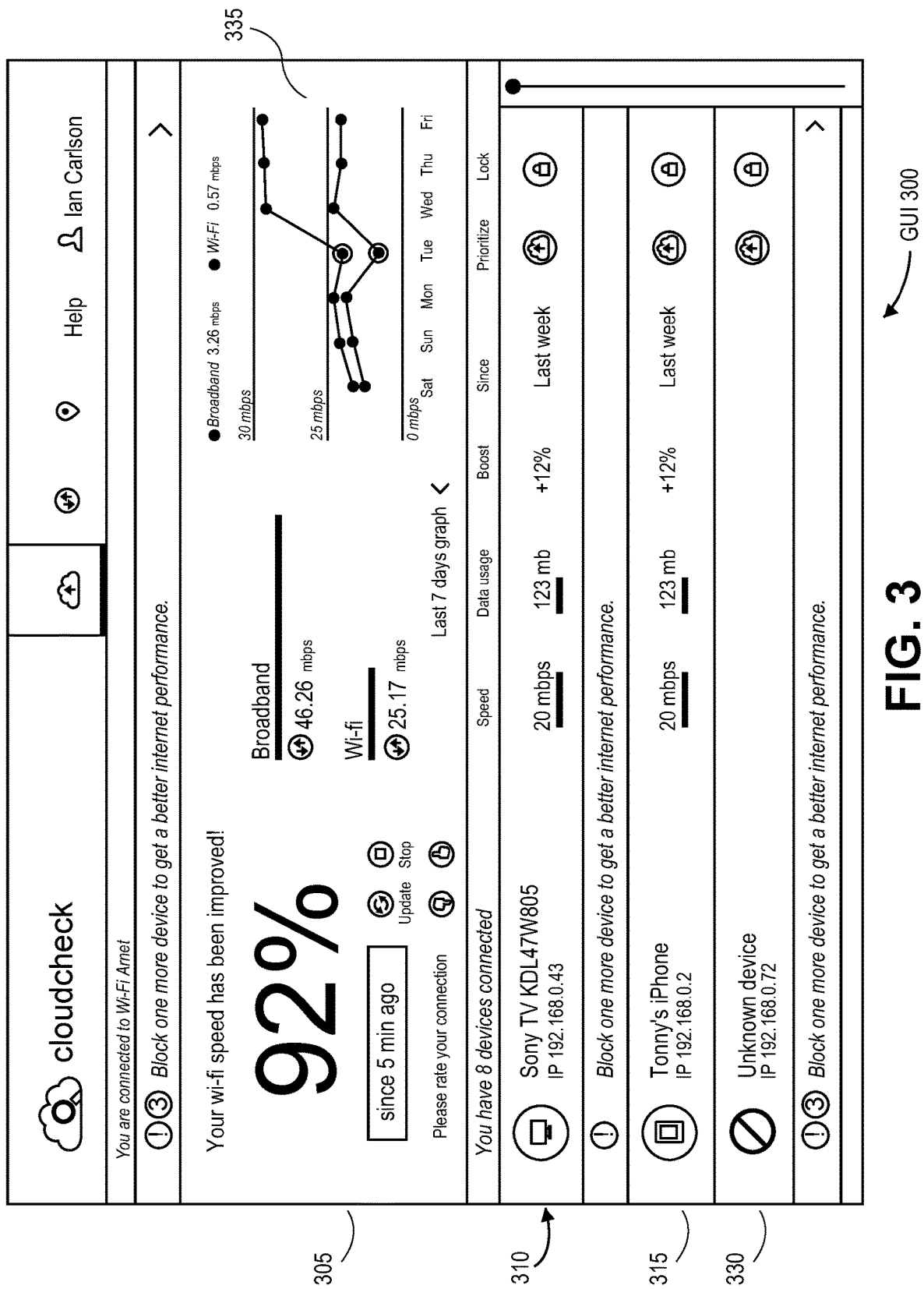
FIG. 3 illustrates another example GUI display in accordance with a different embodiment of the invention.

FIG. 3 illustrates another embodiment for presenting in the GUI 300 on the display screen of the device 105 the current performance and usage information and the historical performance and usage information for the selected WLAN 305 and devices 310, 315 and 330. This embodiment presents the information as a chart 335. In one embodiment, intelligent filtering may be used to reduce the visual clutter on the display from devices connecting and disconnecting to the WLAN and link performance variations from changes in signal strength. Examples of intelligent filtering include filtering based on a minimum RSSI, or a minimum amount of connect time.

Other embodiments include presenting the same type of view as depicted in FIG. 2 (i.e. graphically comparing per device performance) but stacking instead of merging the graphical bars. In another embodiment, the same type of view may be rendered but using only periodically collected performance and usage information rather than initiating a real-time collection of such information. On larger display screens, as may exist on laptop or desktop computer systems, the various alternative embodiments may be presented together, as shown in FIG. 3.

In one embodiment, the device 105 to which to report the current performance and usage information and the historical performance and usage information for the WLAN and/or the devices coupled to the WLAN is a mobile computing device, such as a smartphone. However, it is contemplated in other embodiments that the device may be a laptop or desktop computer as mentioned above, or a notebook computer, a tablet computer, a wireless router, a wireless access point, or a wireless switch. Further, while the embodiment illustrated in FIG. 1 depicts the device 105 located remotely from WLAN 130 and devices connected thereto, in other embodiments, the device may be located in the WLAN 130, for example, the device may be any one of devices 120 and 125a-125n. Additionally, while the embodiment illustrated in FIG. 1 depicts the device 105 located remotely from the agent executing on one of devices 120 and 125a-125n, in another embodiment, device 105 is coupled to the WLAN and the agent is resident, and executing directly on, the device 105.

In one embodiment, once the device 105 receives the information and presents it in the GUI on its display screen, a setting on one or more of the WLAN and the devices coupled to the WLAN may be changed. Examples of such settings include a channel selection, a bandwidth setting, a power setting, a data transmission rate, a mode of operation, a quality of service (QoS) parameter, and a beacon interval. After the setting is changed, the agent probes for new current performance and usage information for the selected WLAN and/or one or more devices coupled to the WLAN and combines the new current performance and usage information with the historical performance and usage information for the selected WLAN and/or one of more of the devices coupled to the WLAN, for forwarding to the device 105 for presentation in the GUI on the display screen of the device as new current performance and usage information and the historical performance and usage information for the WLAN and/or one or more of the devices coupled to the WLAN.

The device 105, server 110, or one of devices 120 and 125a-125n, may be a general purpose or special purpose computer system, in accordance with the embodiments described herein, within which a set of instructions, for causing the aforesaid devices to perform any one or more of the methodologies discussed herein, may be executed. In alternative embodiments, these devices may be connected, networked, interfaced, etc., with other machines in a Local Area Network (LAN), a Wide Area Network, an intranet, an extranet, or the Internet. One or more of the devices may operate in the capacity of a server or a client in a client-server network environment, or as a peer in a peer-to-peer (or distributed) network environment. In certain embodiments, each of the devices may be in the form of a personal computer (PC), a tablet PC, a set-top box (STB), a Personal Digital Assistant (PDA), a cellular telephone, a web appliance, a server, a network router, switch or bridge, computing system, Internet enabled television, or any machine capable of executing a set of instructions (sequential or otherwise) that specify actions to be taken by that machine. Further, where only a single machine is illustrated, the term "machine" shall also be taken to include any collection of machines (e.g., computers) that individually or jointly execute a set (or multiple sets) of instructions to perform any one or more of the methodologies discussed herein.

One or more of the devices may include a non-transitory machine-readable storage medium (or more specifically a non-transitory machine-accessible storage medium) on which is stored one or more sets of instructions (e.g., software) embodying any one or more of the methodologies or functions described herein. Software may also reside, or alternatively reside within a main memory of a device, and may further reside completely or at least partially within a processor(s) during execution thereof by a computing system, the main memory and the processor(s) also constituting machine-readable storage media. The software may further be transmitted or received over a network via a network interface card.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method for providing current performance and usage information and historical performance and usage information about one or more of a wireless local area network (WLAN) or a plurality of devices coupled to the WLAN to a device, comprising:
 receiving, at a server coupled in communication with a WLAN or an agent executing on at least one of a plurality of devices, input from a device, the input causing the server or the agent to select one or more of the WLAN or the plurality of devices coupled to the WLAN for which to report the current performance and usage information and the historical performance and usage information to the device;
 retrieving at the server or the agent the historical performance and usage information for the selected one or more of the WLAN or the plurality of devices coupled to the WLAN;
 retrieving at the server or the agent the current performance and usage information from the selected one or more of the WLAN or the plurality of devices coupled to the WLAN; and
 transmitting from the server or the agent to the device to present the current performance and usage information and the historical performance and usage information for the selected one or more of the WLAN or the plurality of devices coupled to the WLAN in a graphical user interface (GUI) on a display screen of the device.

2. The method of claim 1, further comprising presenting in a graphical user interface (GUI) on a display screen of the device, the current performance and usage information and the historical performance and usage information for the selected one or more of the WLAN or the plurality of devices coupled to the WLAN.

3. The method of claim 2, further comprising presenting in the graphical user interface (GUI) on the display screen of the device, for the selected one or more of: the WLAN or the plurality of devices coupled to the WLAN, one or more of: a type of the device, a status of the device, actions performed on the device that affect performance or usage of one or more of the WLAN or the plurality of devices coupled to the WLAN, or actions performed on the device that affect performance and/or usage of the device.

4. The method of claim 2, wherein presenting in the GUI on the display screen of the device the current performance and usage information and the historical performance and usage information for the selected one or more of: the WLAN or the plurality of devices coupled to the WLAN comprises presenting the current performance and usage information for the selected one or more of the WLAN or the plurality of devices coupled to the WLAN in a first graphical bar, and presenting the historical performance and usage information for the selected one or more of the WLAN or the plurality of devices coupled to the WLAN in a second graphical bar.

5. The method of claim 4, wherein the first graphical bar and the second graphical bar overlap at least in part and are distinguished from each other by a different graphical characteristic.

6. The method of claim 5, wherein the graphical characteristic includes one or more of: color, shading, transparency, translucency, or border.

7. The method of claim 4, wherein presenting in the GUI on the display screen of the device the current performance and usage information and the historical performance and usage information for the selected one or more of the WLAN or the plurality of devices coupled to the WLAN comprises presenting in the GUI on the display screen of the device the current performance and usage information for the selected one or more of the WLAN or the plurality of devices coupled to the WLAN in a vertically-scrolling newsfeed-style display, or a multiple page view display in which a selected one of the multiple page views is displayed by receiving user input swiping or tapping the display to transition to the selected one of the multiple page views.

8. The method of claim 7, wherein presenting the current performance and usage information in the newsfeed style display comprises sorting the current performance and usage information according to a priority or ordering scheme including or based on a chronological ordering scheme, a reverse chronological ordering scheme, a magnitude of change in performance for one or more of: the WLAN or the plurality of devices coupled to the WLAN, a type of the devices, a status of the devices, an action performed on the device that affect performance and/or usage of one or more of the WLAN or the plurality of devices coupled to the WLAN, an action performed on the device that affects performance and/or usage of the device, or base station identifiers.

9. The method of claim 1, wherein receiving at the agent executing on at least one of the plurality of devices input from the device to select one or more of the WLAN or the plurality of devices coupled to the WLAN for which to report the current performance and usage information and the historical performance and usage information to the device, further comprises issuing from the agent a request to the server coupled in communication with the agent to provide the historical performance and usage information for the selected one or more of the WLAN or the plurality of devices coupled to the WLAN, wherein retrieving at the agent the historical performance and usage information for the selected one or more of the WLAN or the plurality of devices coupled to the WLAN comprises retrieving at the agent the historical performance and usage information for the selected one or more of the WLAN or the plurality of devices coupled to the WLAN responsive to the request.

10. The method of claim 9, further comprising: issuing from the agent a second request to the server coupled in communication with the agent to provide the current performance and usage information for the selected one or more of the WLAN or the plurality of devices coupled to the WLAN; and, wherein retrieving at the agent the current performance and usage information for the selected one or more of the WLAN or the plurality of devices coupled to the WLAN comprises retrieving at the agent the current performance and usage information for the selected one or more of the WLAN or the plurality of devices coupled to the WLAN responsive to the second request.

11. The method of claim 10, further comprising:
uploading to the server current performance and usage information for the WLAN or the plurality of devices coupled to the WLAN; and
processing and validating at the server the current performance and usage information for the WLAN or the plurality of devices coupled to the WLAN, wherein issuing from the agent the second request to the server coupled in communication with the agent to provide the current performance and usage information for the selected one or more of the WLAN or the plurality of devices coupled to the WLAN comprises issuing from the agent a second request to the server coupled in communication with the software agent to provide the validated current performance and usage information for the selected one or more of the WLAN or the plurality of devices coupled to the WLAN.

12. The method of claim 9, wherein the server is: co-located with the agent on one of the plurality of devices coupled to the WLAN, located on a different one of the plurality of devices coupled to the WLAN than the device on which the agent is located, or is remotely located from the WLAN or coupled in communication with the agent over an internetwork.

13. The method of claim 12, further comprising the server receiving the request and obtaining from a memory storage system accessible on or to the server the historical performance and usage information for the selected one or more of the WLAN or the plurality of devices coupled to the WLAN responsive to the agent issuing the request.

14. The method of claim 1, wherein receiving at the server coupled in communication with the WLAN input from the device to select one or more of the WLAN or the plurality of devices coupled to the WLAN for which to report the current performance and usage information and the historical performance and usage information to the device, further comprises issuing from the server a request to the agent to provide the historical performance and usage information for the selected one or more of the WLAN or the plurality of devices coupled to the WLAN, wherein retrieving at the server the historical performance and usage information for the selected one or more of the WLAN or the plurality of devices coupled to the WLAN comprises retrieving at the server the historical performance and usage information for the selected one or more of the WLAN or the plurality of devices coupled to the WLAN responsive to the request.

15. The method of claim 14 further comprising the server receiving periodic UDP pings from the agent to maintain a network address and port translation (NAPT) rule such that the server is able to issue the request to the agent at any time to provide the historical performance and usage information for the selected one or more of the WLAN or the plurality of devices coupled to the WLAN.

16. The method of claim 14, further comprising:
issuing from the server a second request to the agent to provide the current performance and usage information for the selected one or more of the WLAN or the plurality of devices coupled to the WLAN; and,
wherein retrieving at the server the current performance and usage information for the selected one or more of the WLAN or the plurality of devices coupled to the WLAN comprises retrieving at the server the current performance and usage information for the selected one or more of the WLAN or the plurality of devices coupled to the WLAN responsive to the second request.

17. The method of claim 9, further comprising: obtaining at the server, by measurements collected over a period of time, the historical performance and usage information for the selected one or more of the WLAN or the plurality of devices coupled to the WLAN; and
storing the measurements in the memory storage system accessible on or to the server, for later retrieval and provisioning to the agent responsive to the agent issuing the request to the server to provide the historical performance and usage information for the selected one or more of the WLAN or the plurality of devices coupled to the WLAN.

18. The method of claim 1, wherein the device, to which to report the current performance and usage information and the historical performance and usage information for one or more of the WLAN or the plurality of devices coupled to the WLAN, includes one or more of: a desktop computer, a laptop computer, a notebook computer, a tablet computer, a wireless mobile computing device, a wireless router, a wireless access point, and a wireless switch.

19. The method of claim 1, wherein receiving at the agent executing on at least one of the plurality of devices input from the device to select one or more of the WLAN or the plurality of devices coupled to the WLAN for which to report the current performance and usage information and the historical performance and usage information to the device, comprises receiving the input at the agent executing on the device.

20. The method of claim 1, wherein the current performance and usage information is provides as one or more of: a data transmission throughput, network-layer throughput, latency, jitter, connectivity, error rates, a received signal strength indication, a signal-to-noise ratio, power consumption, transmit power, security information, and quantity of data bytes transmitted, for the selected one or more of the WLAN or the plurality of devices coupled to the WLAN according to or on a timeline, or in comparison to a historical baseline for the one or more of data transmission throughput, network-layer throughput, latency, jitter, connectivity, error rates, received signal strength indication, a signal-to-noise ratio, power consumption, transmit power, security information, or quantity of data bytes transmitted, for the selected one or more of the WLAN or the plurality of devices coupled to the WLAN.

21. The method of claim 1 further comprising:
changing a setting on one or more of the WLAN or the plurality of devices coupled to the WLAN;
probing, from the agent, for new current performance and usage information for the selected one or more of the WLAN or the plurality of devices coupled to the WLAN, responsive to the changed setting; and
combining at the agent the new current performance and usage information for the selected one or more of the WLAN or the plurality of devices coupled to the WLAN or the historical performance and usage information for the selected one or more of the WLAN or the plurality of devices coupled to the WLAN, for forwarding to the device for presentation in the graphical user interface (GUI) on the display screen of the device as new current performance and usage information and the historical performance and usage information for the selected one or more of the WLAN or the plurality of devices coupled to the WLAN.

22. A method for reporting current performance and usage information and historical performance and usage information about one or more of a wireless local area network (WLAN) and a plurality of devices coupled to the WLAN to a device, comprising:
receiving input from the device to select one or more of the WLAN or the plurality of devices coupled to the WLAN for which to report the current performance and usage information and the historical performance and usage information to the device;
transmitting the input to a server coupled in communication with the WLAN, or an agent executing on at least one of the plurality of devices;
receiving from the server or the agent the historical performance and usage information for the selected one or more of the WLAN or the plurality of devices coupled to the WLAN;
receiving from server or the agent the current performance and usage information from the selected one or more of the WLAN or the plurality of devices coupled to the WLAN; and
presenting in a graphical user interface (GUI) on a display screen of the device, the current performance and usage information and the historical performance and usage information for the selected one or more of the WLAN or the plurality of devices coupled to the WLAN.

23. A computer-readable non-transitory storage medium, comprising computer instructions, that when executed, cause a computing device coupled in communication with a wireless local area network (WLAN) to provide current performance and usage information and historical performance and usage information about one or more of the WLAN or a plurality of devices coupled to the WLAN to a device, comprising:
receiving at a server coupled in communication with the WLAN or an agent executing on at least one of the plurality of devices, input from the device, the input causing the server or the agent to select one or more of the WLAN or the plurality of devices coupled to the WLAN for which to report the current performance and usage information and the historical performance and usage information to the device;
retrieving at the server or the agent the historical performance and usage information for the selected one or more of the WLAN or the plurality of devices coupled to the WLAN;
retrieving at server or the agent the current performance and usage information from the selected one or more of the WLAN or the plurality of devices coupled to the WLAN; and
transmitting from the server or the agent to the device to present the current performance and usage information and the historical performance and usage information for the selected one or more of the WLAN or the plurality of devices coupled to the WLAN in a graphical user interface (GUI) on a display screen of the device.

24. The computer-readable medium of claim 23, further comprising computer instructions for presenting in a graphical user interface (GUI) on a display screen of the device, the current performance and usage information and the historical performance and usage information for the selected one or more of the WLAN or the plurality of devices coupled to the WLAN.

25. The computer-readable medium of claim 24, further comprising computer instructions for presenting in the graphical user interface (GUI) on the display screen of the device, for the selected one or more of the WLAN or the plurality of devices coupled to the WLAN, one or more of: a type of the device, a status of the device, actions performed on the device that affect performance and/or usage of one or more of the WLAN or the plurality of devices coupled to the WLAN, or actions performed on the device that affect performance and/or usage of the device.

26. The computer-readable medium of claim 24, wherein presenting in the GUI on the display screen of the device the current performance and usage information and the historical performance and usage information for the selected one or more of the WLAN or the plurality of devices coupled to the WLAN comprises presenting the current performance and usage information for the selected one or more of the WLAN or the plurality of devices coupled to the WLAN in a first graphical bar, and presenting the historical performance and usage information for the selected one or more of the WLAN or the plurality of devices coupled to the WLAN in a second graphical bar.

* * * * *